Nov. 8, 1966 W. SCHLENKER 3,284,687
SMALL SIZE DIRECT CURRENT MOTOR
Filed July 7, 1961 4 Sheets-Sheet 1

5, 5a, 5b, 5c 6, 6a, 6b, 6c

Nov. 8, 1966     W. SCHLENKER     3,284,687
SMALL SIZE DIRECT CURRENT MOTOR
Filed July 7, 1961     4 Sheets-Sheet 2

United States Patent Office 3,284,687
Patented Nov. 8, 1966

3,284,687
SMALL SIZE DIRECT CURRENT MOTOR
Walter Schlenker, Schwenningen (Neckar), Germany, assignor to Siemens & Halske Aktiengesellschaft, Berlin and Munich, Germany, a corporation of Germany
Filed July 7, 1961, Ser. No. 122,431
11 Claims. (Cl. 318—138)

This invention is concerned with a small size transistor controlled direct current motor adapted for driving or winding delicate mechanical devices or appliances.

The principal feature of previously used motors of this kind resides in the provision of contacts which are made either in the form of collectors with carbon brushes, to transmit the current to the individual armature windings according to the prevailing armature position, or which are, in the case of stepping motors with massive or magnetic armatures, operative to switch in and out individual field windings likewise according to the armature position.

In order to keep the corresponding motor always in operating condition, all these contacts must be periodically checked, cleaned or renewed. While this drawback might possibly be tolerated in the case of appliances which are merely used intermittently or from time to time, it can not be tolerated in the case of continuously operating appliances or devices, for example, master clocks or in continuously operating control or supervision or indicating apparatus, in which the failure or temporary stopping of the motor for maintenance work would in many cases result in serious operating troubles.

Another disadvantage of prior small size direct current motors resides in the interference action which they exert on nearby radio and television receivers. Particular difficulties are encountered in rendering harmless the recently introduced stepping motors with magnetic armatures, in which high voltage peaks are produced by the rotating magnet armature.

Small size alternating current motors are for these reasons used, whenever possible, for particularly sensitive appliances, despite the fact that the corresponding appliances are thereby made dependent on the reliability of the commercial current supply. However, there are many instances in which this chance cannot be taken, and there arises, therefore, the need for small size direct current motors which operate entirely without contacts and which thus approach as nearly as possible the reliability of operation and freedom from maintenance observed in connection with small size alternating current motors.

There are no transistor controlled small size direct current motors, operating without contacts, commercially available, despite the fact that the transistor technique offers useful means for connecting and disconnecting current circuits without resorting to the use of contacts. This notable deficiency may be traced to the following causes: If a series wound motor or shunt wound motor of customary kind is considered as a starting point for the construction of a small size direct current motor, each individual contact must be replaced by a transistor circuit having at least two stages. However, since these motors have a multitude of contacts—each collector lamella considered as a contact half of a separate contact—a great many transistors would be required. The entire arrangement would become much too complicated and expensive since each of the switching stages would require a control coil and since a rotatable control magnet would have to be provided in common for all control coils. Moreover, the automatic start of the operation of such a transistor controlled motor would occasion considerable difficulties in view of the absence of the required initial control motion.

A stepping motor of known construction, with rotating soft iron armature and provided with only one contact would be better suited for transistor control. However, stepping motors of this kind have the drawback that they do not automatically start in any position of the armature. The armature must after each step be rotated to start position, by the use of an external force, and must be held in such start position until the motor is again operatively connected. In order to achieve this presetting, the opposing torque (drive weight, spring or the like) which is to be overcome by the motor, is, as a rule, by appropriate selection of the gear ratio, so selected that the motor armature rotates upon switching off automatically into the start position until a tooth of a stop wheel, carried by the motor shaft, abuts against a fixedly disposed stop cone. This requirement accounts for the fact that such motors are not universally applicable. They must be accurately custom made to the particular use to which they are to be put, which in turn stands in the way of rational fabrication.

The conditions are more favorable in connection with socalled stepping motors with rotating magnet armature and contact means for change-over polarization of the working coil. These motors operate reliably. The strongly magnetized armature always pulls by its own force into the start position. Moreover, the magnetized armature acts upon switching off as a highly effective brake so that it immediately assumes its normal position, thus avoiding the otherwise usually undesirable idling to stop position. However, since such motors need respectively for the control and pole changing of the working coil at least one change-over contact, the control thereof will require at least two two-stage transistor groups. Moreover, the self starting causes difficulties since the polarity of the working coil, belonging to the prevailing armature position, must also be predetermined for the normal position.

The object of the invention is to provide a small size direct current motor with transistor circuit, which combines the advantages of the stepping motor with rotating magnet armature (reliable start from any normal position and instant stopping upon switching off) with the advantages of the simple stepping motor with soft iron armature (most simple control possibility).

Another object and feature of the invention resides in avoidance of any stopping or locking devices such as they are at times required in connection with small synchronous motors for the definite determination of the direction of rotation.

According to the invention, these objects are achieved by the provision of a structure wherein normal current flows, in the switched-in condition, through the working coil or coils of a stepping motor of known construction, with soft iron armature, for the purpose of starting the operation of the working armature, whereupon a magnetized control armature is during the running of the motor operatively effective, in cooperation with a control coil or a plurality of control coils, to induce in each control coil a voltage, the current or currents of which, amplified over one or a plurality of transistors, affect the normal current flowing through the working coil or working coils in a weakening sense or in a weakening and amplifying sense, depending upon the position of the working armature.

Details of the invention will now be explained with reference to the accompanying drawings showing an embodiment thereof.

Figure 4:
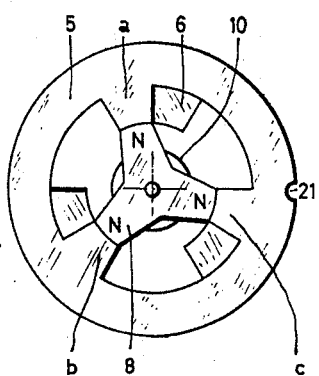
Figure 5:
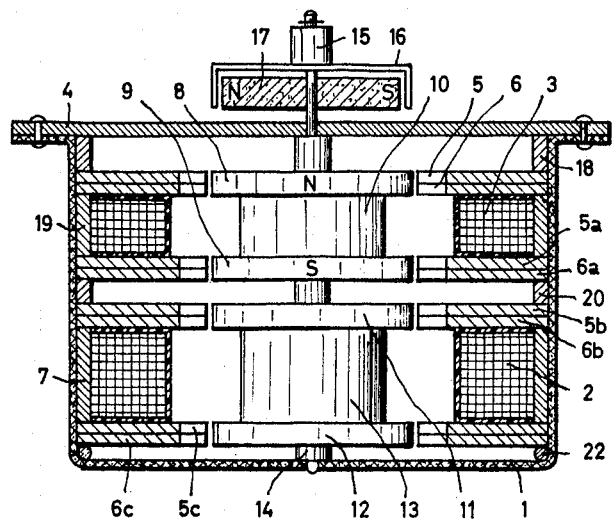
Figure 6:
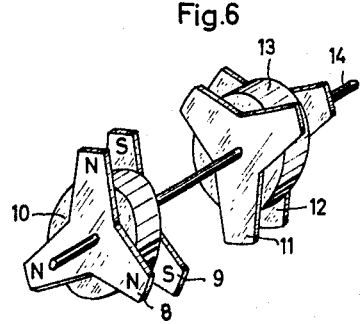
Figure 7:
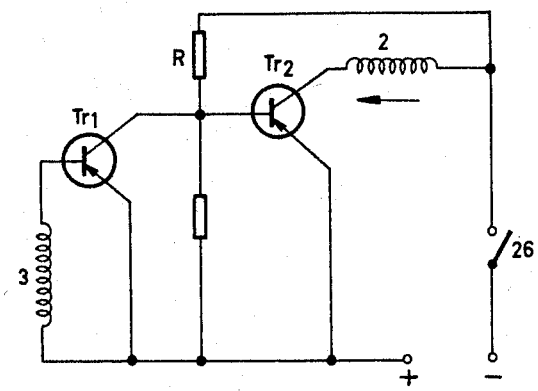
Figure 8:
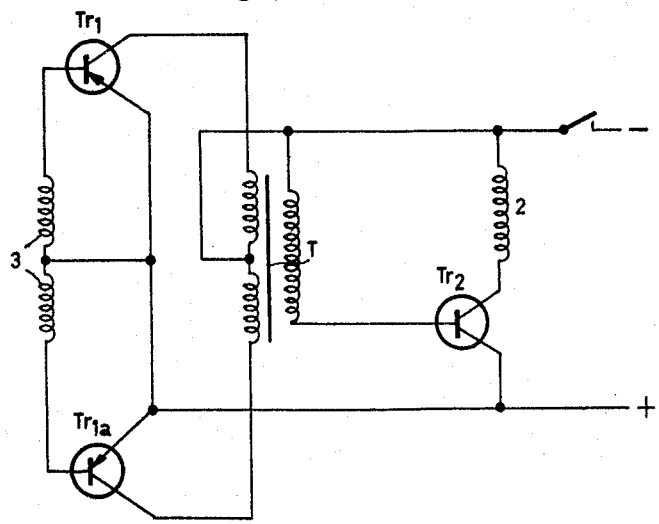
Figure 9:
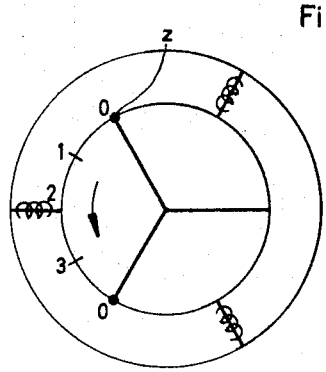
Figure 9:
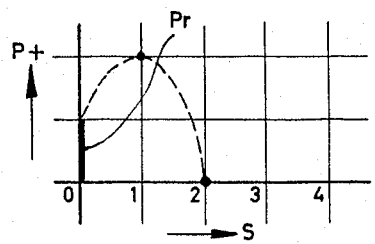
Figure 10:
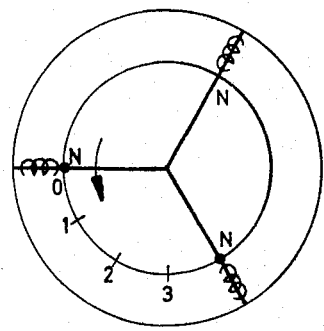
Figure 10:
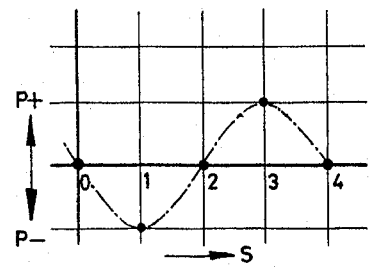
Figure 11:
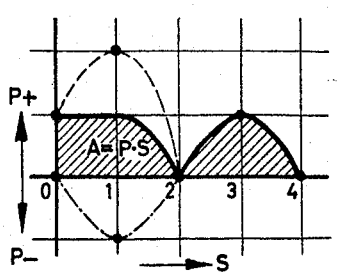
Figure 12:
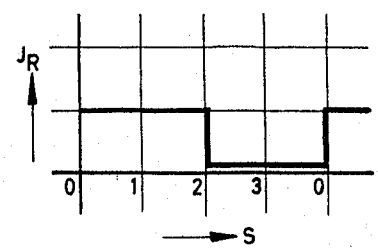

FIG. 4 indicates the control coil with its pole disks, including the control armature in normal position thereof (control pole assembly);

FIG. 5 represents the motor in cross-sectional view;

FIG. 6 shows the armature in perspective view, with the working and control armature parts shown drawn apart for better representation;

FIG. 7 presents the motor circuit with simple control;

FIG. 8 presents the motor circuit with feedback control;

FIG. 9 is a diagram to aid in explaining the working armature torque depending upon the effected armature motion;

FIG. 10 is a diagram to aid in explaining the control armature torque depending upon the effected armature motion;

FIG. 11 shows the resultant of the torque curves indicated in FIGS. 9 and 10; and FIG. 12 indicates the dependence of the normal current $J_R$ on the effected armature motion $s$.

Figure 3:
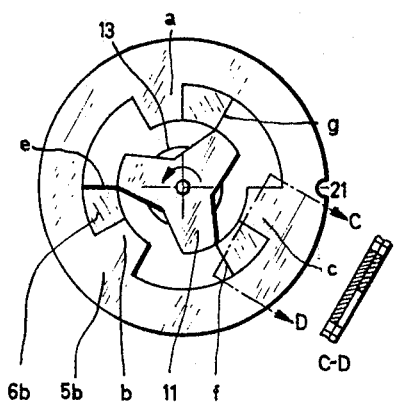
FIG. 3 illustrates the working coil with its pole disks, including the working armature in the normal position thereof (working pole assembly)

The motor shown as an example of the invention comprises the groups of components illustrated in FIGS. 3 and 4, that is, the working pole assembly with the working armature, and the control pole assembly with the control armature. The pole disks 5b, 6b, 5c, 6c form with the working coil the working pole assembly, while the pole disks 5, 6 and 5a, 6a supplement the control coil 3 to form the control pole assembly (FIG. 5).

The position of the pole disks 5 and 6 with respect to the pole disks 5a and 6a, as well as 5b, 6b with respect to 5c, 6c, is not visible in FIGS. 3 and 4. All pole disks which are successively stacked spaced apart are in alignment. As shown in FIG. 5, the working pole assembly and the control pole assembly are disposed axially serially without play, in a circular housing 1 made of magnetically non-conductive material. The pole disks are held against angular displacement by means of an axially extending rib provided in the housing (not visible in FIG. 5) which engages the grooves 21 formed in the disks as shown in FIGS. 3 and 4. The spacing rings 18, 20, 22 (FIG. 5) secure the working and control assemblies in axial direction, and the soft iron rings 19 and 7 hold the pole disks 5, 6 and 5a, 6a as well as 5b, 6b and 5c, 6c in plane-parallel position and provide for the magnetic return path within the respective control and working assemblies.

The armature which is shown in FIG. 6 in perspective view is for easy rotation journalled centrally in the bottom wall of the housing 1 and also centrally in the cover or lid 4.

Figure 1:
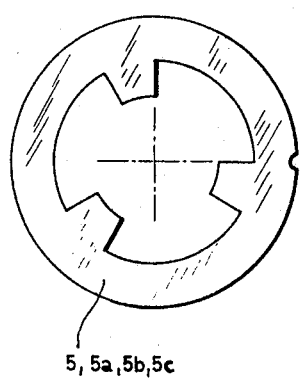
FIG. 1 shows a pole disk with narrow pole pieces for use in connection with working—as well as with control pole assemblies.

The control armature comprises two control armature disks 8 and 9 (FIG. 6) which are disposed, with the respective parts in serial alignment, along and in engagement with opposite plane sides of an axially magnetized permanent magnet 10. The wings or arms of the control armature disk 8 assume by their position with respect to the permanent magnet 10 north pole polarity while the corresponding wings or arms of the disk 9 assume south pole polarity. Since the cross-sectional material area is at the three points, $a, b, c$ (FIGS. 3 and 4 and section C–D) reduced, by the stacking of the pole disks 5 with 6, 5a with 6a, 5b with 6b, 5c with 6c (FIGS. 1, 2 and 5), the control armature will in the normal condition assume the position in which it is shown in FIG. 4. The field line flux of the permanent magnet 10 is closed over the pole arms of the control armature disk 8, the pole pieces $a, b, c$ (FIG. 4), the pole disks 5 and 6 (FIG. 5), the soft iron ring 19, the pole disks 5a, 6a (FIG. 5), and the control armature disk 9.

Figure 2:
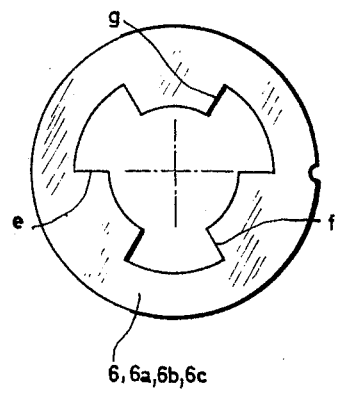
FIG. 2 represents a pole disk with wide pole pieces for use in connection with working—as well as with control pole assemblies.

As shown in FIG. 6, the working armature, which is disposed with the control armature upon a common shaft, comprises the armature disks 11, 12 and the soft iron core 13. The normal position of the working armature is apparent from FIG. 3. The left edges of the pole arms stand approximately in alignment with the leading edges $e, f, g$ of the wide pole pieces with reduced cross sectional areas (FIGS. 2, 3 and section C–D).

When the motor is placed on voltage by the closure of the switch 26 (FIG. 7), a low normal current will flow from the negative (−) pole of a battery (not shown) over a resistor R as well as over the base and emitter of the power transistor $Tr2$ to the positive (+) pole of the battery. The low normal current produces in the collector-emitter circuit of the same transistor ($Tr2$) a higher normal current (corresponding to the amplification factor), and the working coil 2 will accordingly be traversed by a normal current ($J_R$). Owing to the normal position of the working armature 11, 12, 13 (FIG. 5), as illustrated in FIG. 3, near the leading pole piece edges $e, f, g$ with weakened cross section, the motor now begins to run counter clockwise and with definite direction of rotation. The previously described control armature 8, 9, 10 which is fixedly disposed on the shaft is thereby suddenly pulled from its normal position against its holding moment, and a voltage is accordingly induced in the control coil 3.

The control coil 3 which lies in the base-emitter circuit of the control transistor $Tr1$ is so polarized that the high output impedance of the control transistor $Tr1$ in the collector-emitter circuit is not altered by the voltage induced during the start of rotation of the motor (positions 0 to 2 in FIG. 9), due to the blocking action of the transistor $Tr1$ in one direction (emitter-base path). Accordingly, no collector-emitter current will flow.

However, the polarity of the voltage induced in the control coil 3 will change after one-sixth revolution, that is, at the armature position 2 (FIG. 10) and, consequently, the base-emitter impedance in the control transistor $Tr1$ will suddenly drop, causing a control current to flow from the control coil 3 over the base to the emitter and back to the other coil terminal. The collector-emitter impedance will drop as a result of this current flow, and a current will now flow from the negative (−) pole of the battery, over the resistor R, the collector of the transistor $Tr1$ to the emitter, and back to the positive (+) pole of the current source. This sudden current surge produces in the resistor R a relatively strong voltage drop, so that the potential at the base of the power transistor $Tr1$ is strongly shifted in positive direction. Since there is now practically no potential between the base of the power transistor $Tr2$ and its emitter, practically no current will pass from the emitter to the base. This reduction of the base-emitter current causes reduction of the current in the collector-emitter circuit by an amount corresponding to a multiple of the amplification factor, that is, practically to the zero value.

The action of the transistor circuit thus corresponds to that of a simple disconnect operation. From the position 0 to 2 (FIG. 10), a normal current designated as $J_R$ will flow through the working coil 2 (FIG. 7). From the position 2 to 0 (FIG. 10), such normal current is disconnected, to be again connected in position 0, etc. See also FIG. 12.

FIG. 9 shows the approximate torque curve of the working armature 11, 12, 13. The working armature 11, 12, 13, due to the asymmetrical cross-sectional shape of the pole pieces $a, b, c$, is definitely pulled in the direction of the arrow, that is, the force $Pr$ will, after the connection or switching-in, act on the working armature 11, 12, 13. As will be seen from the curve, the torque increases, assumes in position 1 its highest value, and dropping in position 2 to 0.

During this switching-step phase, the control armature—disposed with the working armature 11, 12, 13 on a common shaft (see FIG. 6)—acts in torque impeding manner. Accordingly, the torque curve of the control armature extends from position 0–2 in negative direction.

The actual starting torque from the position 0 to the position 2 (see FIG. 11, position 0–2) will be obtained as a resultant from the addition of the curve values of FIGS. 9 and 10.

The normal current $J_R$ is at the position 2 in previously described manner disconnected by the operation of the transistor circuit shown in FIG. 7. The torque curve of the working armature 11, 12, 13 ends thus in the position 2. However, since the torque of the control armature 8, 9, 10 moves into the positive region—as is apparent from FIG. 10—the positive torque of the control armature 8, 9, 10, as shown in FIG. 11, will fill the torque gap of the working armature 11, 12, 13. The mass of the motor armature 8, 9, 10 and 11, 12, 13 can therefore be held very small, which makes it in turn possible to shorten the idling to stop motion of the motor armature after the switching off.

The shaded area embraced by the torque curve, as shown in FIG. 11, represents the working capacity per switching step as product of the force P which is proportional to the torque and the armature stroke $s$.

The control by means of transistors presupposes a motion and will therefore cease upon overload up to stopping. When the load is too great, the pole arms 11, 12 of the working armature will "clamp" to the nearest pole pieces of the working pole assembly, the working coil 2 of which is upon stopping traversed by the current $J_R$. Only after switching off will the motor armature again pull into the starting position by the torque of the permanent magnet 10.

In order to protect the motor against overload, there is provided the magnetic coupling 15, 16, 17, shown in FIG. 5. In the event that the drive member 15 which is loosely journalled on the shaft but fixedly connected with the soft iron bracket 16, is subjected to excessive braking, the field line flux of the magnet 17 ceases over the soft iron bracket, and the coupling will slip through or idle. This magnetic coupling 15, 16, 17 is also operative to pull the armature after switching off of the motor always into the starting position even, for example, in the event that the opposing torque placed on the drive member 15 should temporarily exceed the torque of the control armature 8, 9, 10.

The motor according to the present invention may also be connected in a circuit such as shown in FIG. 8. The operation will in such a case somewhat differ from that explained in connection with FIG. 7.

Referring now to FIG. 8, the secondary winding of the transformer T is responsive to the switching-in traversed by normal current. This normal current, flowing through the base-emitter path of the transistor Tr2 reduces the resistance between the collector and emitter, so that the working coil 2 is traversed by a strong working current which is effective to start the rotation of the working armature. The control armature 8, 9, 10, disposed upon the same shaft, induces a voltage in the control coil 3. Depending upon the polarity of this induced voltage, current will flow in one or the other control transistor. Assuming that a base-emitter current flows in the transistor $Tr_{1a}$ during the start of rotation, that is, from position 0–2, FIGS. 9 and 10. This base-emitter current produces a correspondingly amplified current to flow from the negative (−) pole of the current source over the lower half of the primary winding of the transformer T, the collector and emitter to the positive (+) pole of the current source. On the collector-emitter current of the transistor $Tr_{1a}$, flowing through the primary winding of the transformer T, is superposed, in an amplifying sense, the direct current (base-emitter current of the power transistor $Tr_2$) which flows in the secondary winding of the transformer T, thus causing an increase in the current flowing through the working coil 2.

The transistor $Tr_{1a}$ is however blocked from the position 2 to 0. The current flow extends over the transistor Tr1 and the collector-emitter current, now increased by the amplification factor and flowing through the upper half of the primary coil of the transformer T, having therefore the opposite direction. The collector-emitter current of the control transistor Tr1 accordingly chokes by superimposition the base-emitter current of the power transistor Tr2 practically to 0. The resistance of the collector-emitter path of the power transistor Tr2 increases thereby to such extent that practically no current flows in the working coil 2. The described change is repeated at the position 0, FIG. 9.

It will be seen, therefore, that the circuit according to FIG. 8 is effective to alternately amplify or to choke, practically to the zero point, the current flowing through the working coil 2, which directly influences the torque of the motor, depending upon the position of the armature.

The motor according to the present invention can also be controlled by only one transistor with appropriately high current amplification, without departing from the scope thereof. In such a circuit, the normal current in the working coils is obtained by negative raising of the base over a resistor, while the control coil remains unaltered in the base-emitter circuit, the working coil remaining unaltered in the collector-emitter circuit.

The invention also presents the possibility to construct the control armature 8, 9, 10 so that the magnet poles with alternating polarity lie in known manner circumferentially on the armature. However, such arrangement requires two alternately operative control and working coils, each with a separate transistor control. The automatic starting is in such arrangement obtained by the effect or normal currents in each of the two working coils as well as by preferential direction resulting from asymmetrical pole piece construction corresponding to the described embodiment.

It is within the scope of the invention also possible, either purely mechanically or by means of an auxiliary contact arrangement which is electrically coupled with the disconnect switch and mechanically connected with the armature, to place the armature into a position which is favorable for the starting. In such arrangement of the motor according to the invention, the weakly magnetized control armature will in normal condition stand in unstable position between the pole pieces of the control pole assembly. The slight inherent torque of the control armature standing thus in unstable manner does not act impeding with respect to the starting torque, but in the same direction of rotation, so that a lower current will suffice for effecting the starting. Moreover, according to experience, the speed of rotation can in such arrangement be varied within wide limits by adjusting the position of the control armature with respect to the working armature. It is in accordance with the invention also possible to equip the motor with coils disposed transverse to the armature axis and also with stacked or laminated pole assemblies of known structure, and to adjust the speed of rotation to the purpose in view, by appropriate selection of the number of pole pairs of the control and working armatures.

The motor according to the invention can also be constructed so that the control armature is provided with relatively few pole pairs while the working armature is for slow speed of rotation provided with a relatively great number of pole pairs. The respective control and working armatures are in such an arrangement interconnected by gear means. Such an arrangement makes it possible to produce despite the low speed of the working armature a relatively high speed of the control armature and therewith a good efficiency thereof.

Changes may be made within the scope and spirit of the appended claims which define what is believed to be new and desired to have protected by Letters Patent.

I claim:

1. A transistor controlled small size direct current motor, comprising a stepping motor with soft iron working armature and working coil means traversed upon operative connection by a normal current for the purpose of starting the rotation of the working armature, a permanent magnet control armature cooperating with control coil means being thereupon during the running of said motor effective to induce in said control coil means a voltage, said armatures having radially extending pole pieces and being disposed on a common shaft in fixed axially spaced relation, said coils being disposed coaxially relative to said armatures in cooperable relation with fixed pole members having pole pieces associated therewith, disposed for operative cooperation with the pole pieces of the associated armature, the pole pieces of the control armature being radially displaced from the pole pieces of the working armature whereby the control armature will, in the normal resting position dispose the working armature in a self-starting position relative to its cooperable fixed pole pieces, transistor means for amplifying the current of said induced voltage, and circuit means for causing said amplified current to affect the magnitude of the normal current flowing through said working coil means depending upon the position of the working armature.

2. A motor according to claim 1, wherein said magnetized control armature is by approximately one half step division angularly displaced with respect to the working armature, for the purpose of effecting after the disconnection of the motor, by means of an auxiliary permanent magnet torque, rotation of the working armature into a position between pole pieces of the working armature assembly which is favorable for the start of the rotation thereof and for holding the working armature in said position.

3. A motor according to claim 1, wherein said control armature is magnetized in axial direction and has circumferentially of one side thereof north poles while having circumferentially of the other side thereof south poles, for the purpose of inducing the control voltage in the direction required for the automatic starting of the motor, from any of the possible normal positions given by the field line flux of the magnetized control armature over the soft iron control pole assembly.

4. A motor as defined in claim 1, wherein said transistor circuit for amplifying the control pulses comprises a power transistor, in the collector-emitter circuit of which is arranged the working coil, with the base thereof being connected by way of a resistor to the pole of the direct voltage source which is opposite to the pole to which is connected the emitter of the transistor, the control coil being connected with the circuit containing said resistor, so that the current flowing therethrough shifts the potential appearing between the base and the emitter, nearly to the zero value, by the action of the control current increase effected by the armature motion.

5. A motor as defined in claim 1, wherein said transistor circuit for amplifying the control pulses comprises a power transistor, in the collector-emitter circuit of which is arranged the working coil with the base thereof being connected with a terminal point of a voltage divider circuit which is connected with a direct current source and contains at least one resistor, such terminal point being connected with the collector-emitter circuit of a control transistor in the base circuit of which is arranged the control coil.

6. A motor as defined in claim 1, wherein said transistor circuit for amplifying the control pulses is constructed as a push-pull circuit, with the base of a power transistor, in the collector-emitter circuit of which is arranged the working coil, being connected with the secondary winding of a transformer which is tapped from the center of the primary winding, the two branches of the primary winding being connected together by way of both collector-emitter circuits of two additional control transistors, the control coil being subdivided with two partial windings thereof disposed in the base circuits of the two control transistors, and the center tap of the partial control windings being connected with the connecting line extending between the emitters of the two control transistors.

7. A motor according to claim 1, wherein said pole members comprise respective pairs of ferromagnetic ring-shaped disks with radially inwardly projecting pole pieces, each armature comprising a pair of pole disks having radially outwardly projecting pole pieces, a cylindrical soft iron ring disposed between each pair of ring-shaped disks, the outer diameter of which ring corresponds to the outer diameter of the ring-shaped disks, the respective coils each being disposed within the space defined by the respective rings and the ring-shaped disks associated therewith, and a cylindrical core for each armature, extending coaxial with the shaft axis and disposed between the respective pole disks of the associated armature, the core of the control armature being a permanent magnet which is magnetized in axial direction.

8. A motor according to claim 7, wherein each armature has a like number of pole pieces which are equivalent to the number of pole pieces associated with each pole member.

9. A motor as defined in claim 8, wherein said transistor circuit for amplifying the control pulses comprises a power transistor, in the collector-emitter circuit of which is arranged the working coil, with the base thereof being connected by way of a resistor to the pole of the direct voltage source which is opposite to the pole to which is connected the emitter of the transistor, the control coil being connected with the circuit containing said resistor, so that the current flowing therethrough shifts the potential appearing between the base and the emitter, nearly to the zero value, by the action of the control current increase effected by the armature motion.

10. A motor as defined in claim 8, wherein said transistor circuit for amplifying the control pulses comprises a power transistor, in the collector-emitter circuit of which is arranged the working coil with the base thereof being connected with a terminal point of a voltage divider circuit which is connected with a direct current source and contains at least one resistor, such terminal point being connected with the collector-emitter circuit of a control transistor in the base circuit of which is arranged the control coil.

11. A motor as defined in claim 8, wherein said transistor circuit for amplifying the control pulses is constructed as a push-pull circuit, with the base of a power transistor, in the collector-emitter circuit of which is arranged the working coil, being connected with the secondary winding of a transformer which is tapped from the center of the primary winding, the two branches of the primary winding being connected together by way of both collector-emitter circuits of two additional control transistors, the control coil being subdivided with the two partial windings thereof disposed in the base circuits of the two control transistors, and the center tap of the partial control windings being connected with the connecting line extending between the emitters of the two control transistors.

References Cited by the Examiner
UNITED STATES PATENTS

| | | | |
|---|---|---|---|
| 2,432,234 | 12/1947 | Girard | 310—103 |
| 2,760,093 | 8/1956 | Button | 310—156 X |
| 2,866,109 | 12/1958 | Watson | 310—46 X |
| 2,867,762 | 1/1959 | Lehman | 318—254 |
| 2,968,755 | 1/1961 | Baermann | 318—254 |
| 3,098,958 | 7/1963 | Katz | 318—138 |
| 3,136,935 | 6/1964 | Hogan et al. | 318—138 |

ORIS L. RADER, *Primary Examiner.*

D. J. SHREWSBERRY, J. C. BERENZWEIG,
*Assistant Examiners.*